United States Patent [19]

Chang

[11] 4,182,822
[45] Jan. 8, 1980

[54] HYDROPHILIC, SOFT AND OXYGEN PERMEABLE COPOLYMER COMPOSITION

[76] Inventor: Sing-Hsiung Chang, 6 Buckskin Height Dr., Danbury, Conn. 06810

[21] Appl. No.: 740,128

[22] Filed: Nov. 8, 1976

[51] Int. Cl.² .................. C08F 26/10; C08F 30/08
[52] U.S. Cl. .................. 526/264; 526/227; 526/279
[58] Field of Search ............ 526/279, 264, 262

[56] References Cited

U.S. PATENT DOCUMENTS

| | | | |
|---|---|---|---|
| 3,808,178 | 4/1974 | Gaylord | 526/279 |
| 3,948,871 | 4/1976 | Butterfield et al. | 526/240 |

*Primary Examiner*—Herbert J. Lilling

[57] ABSTRACT

A new composition of matter specially adapted for the production of contact lenses, artificial eyes or other prosthetic devices. The composition has the characteristics of increased hydrophilicity, softness after hydration and oxygen permeability. The composition is a solid copolymer of comonomers consisting essentially of about 15 to 65 parts by weight of one or more of the amide group containing monomers and about 10 to 85 parts by weight of one or more of the polysiloxanylalkyl ester of acrylate or methacrylate. Optionally, 0 to 75 parts by weight of at least one of the property modifier vinyl monomers such as methyl methacrylate, ethylacrylate, etc., can be employed into the copolymers. The inventive material is optionally transparent, translucent or opaque depending on the type, composition and relative content of the comonomers. In general, the transparent composition is suitable for use in making contact lenses.

14 Claims, No Drawings

HYDROPHILIC, SOFT AND OXYGEN PERMEABLE COPOLYMER COMPOSITION

FIELD OF INVENTION

This invention relates to novel copolymer compositions, and more particularly to hydrophilic, soft after hydration and oxygen-permeable copolymers. The inventive copolymers can be fabricated to, and provide, improved contact lenses, artificial eyes or other prosthetic devices.

DISCUSSION OF THE PRIOR ART AND BACKGROUND OF THE INVENTION

The basic requirements for polymeric materials in some areas of medical application are that they be hydrophilic, soft and oxygen-permeable. The prior art teaches the use of many different polymeric materials in medical areas such as in contact lenses, in artificial membranes e.g., artificial skin for surgical and burn dressings, membranes for an artificial lung machine, in other prosthetic devices such as prosthetic eye, pacemaker and other devices such as intrauterine, etc. Although these polymers possess certain desirable properties for their specific medical application, they suffer from other undesirable characteristics which reduce their utility.

In contact lens area, the hard lens material, polymethylmethacrylate (PMMA), is rigid and durable but relatively impermeable to oxygen and further suffers from being hydrophobic. The hydrogel contact lens based on hydrophilic polymers such as polyhydroxyethyl methacrylate (Poly HEMA) are soft but with poor durability and dimensional stability. It also does not have enough oxygen permeability.

The copolymers taught in U.S. Pat. No. 3,808,178 for contact lens fabrication are with relatively high oxygen permeability, but suffer from being rigid and relatively hydrophobic.

Another polymeric material is silicone rubber such as polysiloxane which is most widely used in a medical application, such as in a prosthetic eye, pacemakers, heart valves and intestinal sections. It is also used in contact lenses and artificial lung machines, etc. Although it is soft, resilient and is highly gas permeable, it is hydrophobic. Due to the low strength of polysiloxane, a filler which increases the refractive index of the mixture, must be added to improve the durability.

Accordingly, it would be highly useful in a number of medical applications to provide a polymeric material having increased hydrophilicity, softness after hydration, and oxygen permeability. For contact lenses, this material provides a combination of properties that are close to an ideal combination of properties of the best features of the hard lens material, PMMA, soft lens material, poly HEMA, silicone rubber and the Gaylord copolymer lenses. For other prosthetic devices, features such as increased hydrophilicity, softness after hydration and gas permeability are also very useful and desirable. The inventive composition has been found to provide the above features.

SUMMARY OF THE INVENTION

The invention relates to a new composition of matter specially adapted for the production of contact lenses, artificial eyes or other prosthetic devices.

The inventive composition has an object to provide increased hydrophilicity, softness after hydration and oxygen-permeability for hard contact lens material, polymethyl methacrylate.

Still another object of the invention is also to provide for increasing the oxygen permeability of soft lens material, polymerized acrylates, methacrylates or their copolymers with N-vinyl pyrrolidone.

Yet another object of the invention is to provide increased hydrophilic, soft after hydration and oxygen-permeable contact lens material.

A still further object of the invention is to provide a material which can be made into prosthetic devices and other devices such as intra-uterine devices.

The novel copolymers which are disclosed are prepared by essentially copolymerizing the amide group containing monomers with polysiloxanylalkyl ester of acrylic or methacrylic acids. Particularly effective for this invention is a copolymer composition consisting essentially of:

(a) about 15 to 65, preferably 20 to 45 weight percent of at least one of the hydrophilic amide group containing monomers; and (b) about 10 to 85, preferably 25 to 55 weight percent of at least one of the polysiloxanylalkyl acrylate and methacrylate.

Typical amide group containing monomers that are suitable for the practice of this invention include:

(a) N-vinyl pyrrolidone having the structure

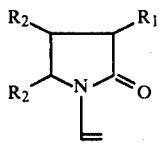

wherein $R_1$, $R_2$ and $R_3$, which may be the same or different, are selected from a class consisting of hydrogen and $C_1$-$C_4$ alkyl groups; and (b) acrylamide and methacrylamide having the structure

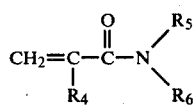

wherein $R_4$ is selected from a class consisting of a methyl group and hydrogen; $R_5$ and $R_6$, which may be the same or different, are selected from a class consisting of hydrogen and $C_1$-$C_4$ alkyl groups, wherein the selections of $R_5$ and $R_6$ both from hydrogen are excluded.

The polysiloxanylalkyl acrylate or methacrylate comonomer has the structural formulation as follows:

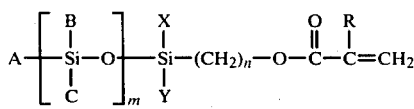

wherein X and Y, which may be the same or different, are selected from a class consisting of $C_1$-$C_4$ alkyl groups, phenyl groups and Z groups having the structure:

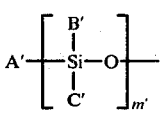

wherein A, B, C, A', B' and C', which may be the same or different, are selected from a class consisting of C₁-C₄ alkyl groups and phenyl groups; R is selected from a class consisting of a methyl group and hydrogen; m and m', which may be the same or different, are integers from one to four; and n is an integer from one to three.

The general procedure to synthesize the polysiloxanyl alkyl acrylate or methacrylate was illustrated and described in the patent to Gaylord, U.S. Pat. No. 3,808,178, issued on Apr. 30, 1974. This comonomer can directly be incorporated into the copolymer of this invention by the technique well known in the art. It can also be prepared into a multi-acrylated or methacrylated polysiloxane (MAPS) by means of the well known acid catalyzed siloxane condensation methods, such as the one illustrated in the Example 15 of the above mentioned patent. (The S₁ used in the Example 1 of this Application was actually prepared by this method.) The MAPS thus prepared containing the units of polysiloxanyl alkyl acrylate or methacrylate is then copolymerized with other comonomers into the desired copolymers of this invention by the well known technique of addition polymerization.

At present it is preferred to employ polysiloxanylalkyl acrylate or methacrylate which have a straight or branched siloxane chain containing two to six silicon atoms having methyl or phenyl substituents and one to three ethylene groups connecting the siloxanyl chain to the acryloxy or methacryloxy group.

Representative polysiloxanylalkyl ester comonomers which may be employed in the practice of the invention include:

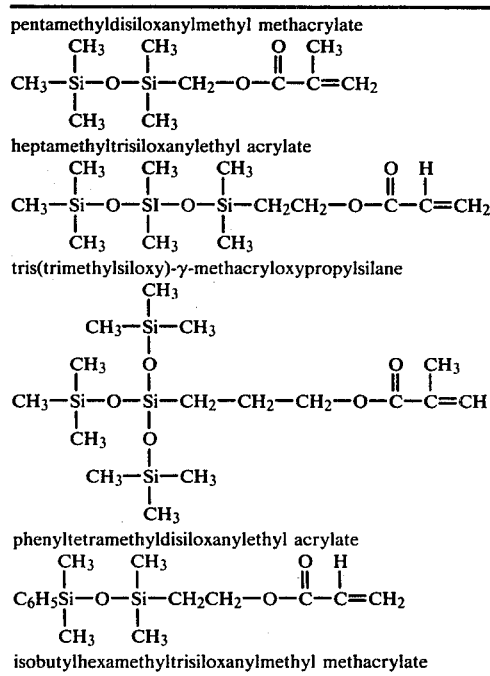

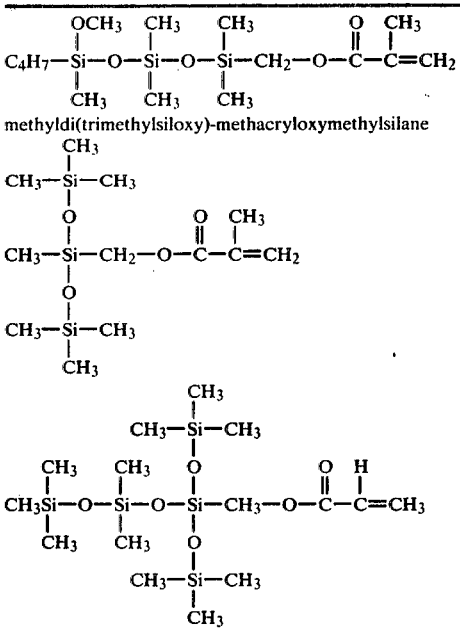

Optionally, the physical properties of the copolymer in this invention can be modified by copolymerizing the composition mixture with one or more of the property modifiers which are vinyl group containing monomers. For example, in order to increase the strength, hardness, or in some cases to improve the optical properties or to act as extender or additive of the copolymers, 0 to about 75, preferably 5 to 30, parts by weight of one or more of the following vinyl group containing monomers or an ester of a C₁-C₂₀ monohydric alkanol and an acid selected from a class consisting of acrylic and methacrylic acids, such as methyl acrylate and methacrylate, ethyl acrylate and methacrylate, propyl acrylate and methacrylate, isopropyl acrylate and methacrylate, butyl acrylate and methacrylate, amyl acrylate and methacrylate, hexyl acrylate and methacrylate, heptyl acrylate and methacrylate, octyl acrylate and methacrylate, 2-ethylhexyl acrylate and methacrylate, nonyl acrylate and methacrylate, decyl acrylate and methacrylate, undecyl acrylate and methacrylate, lauryl acrylate and methacrylate, cetyl acrylate and methacrylate, octadecyl acrylate and methacrylate, 1,1,9-trihydrofluorononyl methacrylate and acrylate, tetrahydrofurfuryl acrylate and methacrylate, cyclohexyl methacrylate and acrylate, propylene glycol monomethacrylate and acrylate, but not limited thereto, can be incorporated into the materials by the technique of copolymerization with a varying degree of satisfaction.

The rigidity of the copolymer in this invention can also be improved, if desired, by incorporating into the material with 0 to about 20, preferably, 0 to 4 parts by weight of one or more of the vinyl group containing crosslinking monomers. Representative of crosslinking monomers which are suitable for the practice of this invention are polyol dimethacrylate or diacrylate or a polyol acrylic ester of higher functionality, for example, mono, di, tri, or tetraethylene glycol dimethacrylate, butylene glycol dimethacrylate, neopentyl diacrylate and pentaerythritol triacrylate or tetracrylate.

The inventive copolymer is optionally transparent, translucent or opaque depending on the type, composition and relative content of the comonomers. Generally speaking, the transparent product is especially suitable for contact lens fabrication. If a higher percent of N-vinyl pyrrolidone is used as hydrophilic comonomer in the composition, it is preferred to use a lower percent of polysiloxanylalkyl comonomer which is with lower number of silicon atoms and with less polysiloxanyl branch in the chain, e.g., if in the composition it consists 35 weight percent of N-vinyl pyrrolidone, it is preferred that 30 weight percent of pentamethyldisiloxanylmethyl methacrylate is used to that 50 weight percent is used or to that 30 weight percent of n-propyloctamethyltetrasiloxanylpropyl methacrylate is used, the other component being property modifier monomers.

The copolymers of the invention are prepared by contacting the mixture of comonomers with a free radical generating polymerization initiator of the type commonly used in polymerizing ethylenically unsaturated compounds. Representative free radical polymerization initiators are organic peroxides, such as acetyl peroxide, lauroyl peroxide, decanoyl peroxide, stearoyl peroxide, benzoyl peroxide, tertiarybutyl peroxypivalate, diisopropyl peroxycarbonate, tertiarybutyl peroctoate etc. Other catalysts, such as $\alpha,\alpha'$-azobisisobutyronitrile, can also be used. Alternatively, in certain cases the mixture of the comonomers can also be polymerized by radiation initiated polymerization. Conventional polymerization techniques can be employed to produce the novel copolymers. The comonomer mixture containing the free radical initiator generally ranged from 0.01 to about 5, preferably between 0.05 to 2 percent by weight of the reaction mixture is heated to a temperature of from about 42° C. to 100° C. or even higher but preferably between 42° C. to 70° C., to initiate and complete the polymerization.

The polymerization can be carried out directly in a mold with the desired configuration such as for contact lens. Alternatively, the polymerization mixture can be heated in a suitable mold or container to form discs, rods, sheets or other forms which can then be fabricated into the desired shape using conventional equipment and technology known in the art. Instead of employing the bulk polymerization techniques described above, one can employ solution, emulsion or suspension polymerization to prepare the novel copolymers, using techniques conventionally used in the preparation of polymers from ethylenically unsaturated monomers. The copolymer thus produced may be extruded, pressed or molded into rods, sheets or other convenient shapes which are then machined to produce a contact lens or other prosthetic devices. The inventive copolymers can also be tinged with the skill known in the art.

The novel copolymers have vastly increased hydrophilicity in comparison to the copolymers taught in U.S. Pat. No. 3,808,178, the conventional hard lens material, polymethyl methacrylate (PMMA), or silicone rubber used in medical application. For example, a copolymer comprising 45% by volume of N-vinyl pyrrolidone, 25% by volume of tris(trimethylsiloxy)-$\gamma$-methacryloxypropylsilane ($S_1$) and 30% by volume of methyl methacrylate (MMA) as taught in this invention can absorb water or hydrate up to 26% of its weight; whereas the copolymer with the composition of 25% of $S_1$ and 75% of MMA as taught in the above mentioned patent or the hard lens material, PMMA can only be hydrated up to about 0.4% of the weight. The silicone rubber is essentially hydrophobic.

In addition, the novel copolymers taught in this invention have vastly increased softness after hydration. For example, in the above mentioned example before hydration the hardness of the material taught in this invention is at about 73 as measured by Portable Hardness Tester, Model GYZJ 936, Barber-Colman Co., Ill., but after fully hydrated, it became about 14; whereas the other two still keep at about original value, PMMA at about 93 and the other at about 82. Generally speaking the degree of softness of the copolymer after hydration in this invention depends on the degree of its hydrophilicity. The higher the content of the hydrophilic comonomer in the copolymer, the higher the degree of its hydrophilicity and the softer the lens is after hydration. In the practice of this invention it is preferred to select the copolymer with percent of hydration between 2.5% to about 30%.

Furthermore, the novel copolymers have also vastly increased gas permeability in comparison to conventional contact lens materials, PMMA, and soft lens material, polyhydroxyethyl methacrylate (Poly HEMA). For example, a copolymer comprising 30 parts by volume of N-vinyl pyrrolidone, 50 parts of $S_1$ and 20 parts of MMA has an oxygen permeability of about 1,600 c.c.-mil/100 in$^2$/24 hrs/atm compared to an oxygen permeability of about 35 for PMMA and about 15 for poly HEMA. These oxygen permeability values were determined in accordance with ASTM D1434. In general, the degree of oxygen permeability with copolymer in this invention depends on the amount of polysiloxanylalkyl acrylate or methacrylate in the composition; the higher the content, the higher the gas permeability. In addition, the more the silicon atoms or the more polysiloxanyl branch in the polysiloxanylalkyl acrylate or methacrylate, the higher the gas permeability.

In the practice of this invention in contact lens area, the refractive index is an important but noncritical chacteristic. Thus, the refractive index of polymethylmethacrylate, the polymer most widely used in the fabrication of contact lenses, is 1.49. The refractive indices of the copolymers useful in the practice of this invention in the fabrication of contact lenses are preferably selected between 1.40 and 1.50 which can be varied by changing the ratio and nature of the comonomers.

The following examples are presented to illustrate the practice of the invention and not as an indication of the limits of the scope thereof.

EXAMPLES 1–8

These examples illustrate the preparations and properties of the copolymers containing varying proportions of hydrophilic monomers, polysiloxanylalkyl acrylate or methacrylate with or without property modifier monomers and further with or without crosslinking monomers. Furthermore, they also illustrated that a device of prosthesis can be made from directly copolymerizing the composition mixture in a mold with a desired configuration.

The mixture of N-vinyl pyrrolidone (VP), tris(trimethylsiloxy)-$\gamma$-methyacryloxypropylsilane ($S_1$) which was prepared according to the description of Example 15 in the patent to Gaylord, U.S. Pat. No. 3,808,178, with or without methyl methacrylate (MMA), and further with or without crosslinking agent, tetraethylene glycol dimethacrylate (TEGMA) and t-butyl peroxypivalate (t-BPP) (0.004 ml per ml of monomer mixture) was polymerized in a glass tube at 46° C. for 48 hours, followed by placing at 100° C. oven for 10 hours. After the tube was broken they were all in the forms of rods. The composition and properties of the copolymers were collected in the following table. As indicated, all the rods are either transparent or opaque, hard and rigid before hydration which can be cut, machined. polished and finished to contact lenses or other prosthetic devices such as prosthetic eye, etc., with a varying degree of satisfaction.

| | COMPOSITION, VOL. PERCENT | | | | |
|---|---|---|---|---|---|
| Example | VP | $S_1$ | MMA | TEGDM | Properties Before Hydration* |
| 1 | 33 | 67 | 0 | 0 | H, T, R |
| 2 | 50 | 50 | 0 | 0 | H, Op, R |
| 3 | 45 | 25 | 30 | 0 | H, T, R |
| 4 | 40 | 50 | 10 | 0 | H, T, R |
| 5 | 30 | 50 | 20 | 0 | H, T, R |
| 6 | 20 | 50 | 30 | 0 | H, T, R |
| 7 | 10 | 50 | 40 | 0 | H, T, R |
| 8 | 30 | 50 | 15 | 5 | H, T, R |

*T = transparent;
Op = opaque;
H = hard;
R = rigid

EXAMPLES 9–15

These examples illustrate the hydrophilic properties of the novel copolymers.

A small piece of sample (about 0.1 cm width) was cut from the cylindrical rod prepared in the above example, followed by immersing in water for overnight about 18 hours. The hydrophilicity is expressed as percent of hydration which can be calculated as the following formula:

%Hydration = $(\Delta W/Wt) \times 100$ wherein:

$\Delta W$ = weight difference of the sample after and before hydration.
$Wt$ = weight of the sample before hydration.

The approximate value of the % hydration of each copolymer is collected in the following table:

| Example | Sample #$^a$ | % Hydration |
|---|---|---|
| 9 | 3 | 26 |
| 10 | 4 | 14 |
| 11 | 5 | 8 |
| 12 | 6 | 3 |
| 13 | 7 | 2.5 |
| 14 | 1 | 7 |
| 15 | b | 0.5 |

$^a$The number indicates the example number from which the sample was prepared.
$^b$The sample was obtained from the copolymer of 50% by weight of $S_1$ and 50% of MMA as taught in U.S. Pat. No. 3,808,178.

EXAMPLE 16

This example illustrate the increased softness of the copolymers after hydration in this invention.

The hardness of the copolymer prepared in Example 3 before hydration is about 72 as measured by the Portable Hardness Tester, Model GYZJ 936, Barber-Colman Co., Ill., after hydration, it is about 14; whereas the hardness of hard lens material, PMMA, before hydration is about 93, after hydration it is still at about 93. The hardness of the copolymer containing the corresponding composition with that prepared in Example 3, i.e., 25% of $S_1$ and 75% of MMA by volume as taught in U.S. Pat. No. 3,808,178, before hydration is about 82 after hydration it is still at about 82.

EXAMPLE 17

This example illustrates the gas permeability of the copolymers in this invention.

The oxygen permeability of the copolymer prepared in example 5 is about 1,600 cc -mil/100 $in^2$/24 hours/atm. in comparison to about 35 of hard lens material, PMMA, and about 15 of soft lens material, Poly HEMA. These oxygen permeability values were determined in accordance with ASTM D1434.

EXAMPLES 18–21

These examples illustrate the preparation and properties of the copolymers containing different property modifier monomers.

The cylindrical plugs were prepared in the manner described in Examples 1–8 from the mixtures of 33 parts by volume of N-vinyl pyrrolidone (VP), 34 parts of $S_1$ and 33 parts of the following property modifier monomers. The properties of the copolymers as shown in the following table are transparent, hydrophilic, and oxygen permeable.

| Example | Property Modifier Monomer | Properties[1] |
|---|---|---|
| 18 | ethyl methacrylate | T, Hp, O |
| 19 | iso-butyl methacrylate | T, Hp, O |
| 20 | 2-ethylhexyl methacrylate | T, Hp, O |
| 21 | n-lauryl methacrylate | T, Hp, O |

[1]T = transparent;
Hp = hydrophilic;
= oxygen permeable.

EXAMPLE 22–25

These examples illustrate the preparations and properties of the copolymers containing various polysiloxanylalkyl acrylate or methacrylate.

Cylindrical plugs can be prepared in the manner described in Examples 1–8 from the mixture of 20% by volume of N-vinyl pyrrolidone, 60% by volume of MMA and 20% by volume of the following polysiloxanylalkyl acrylate or methacrylate. All the copolymers prepared are hydrophilic, gas permeable and hard before hydration which can be fabricated into contact lenses or other prosthetic devices, such as prosthetic eye etc., with a varying degree of satisfaction.

| Example | Polysiloxanylalkyl Comonomer |
|---|---|
| 22 | pentamethyldisiloxanylmethyl methacrylate |
| 23 | heptamethyltrisiloxanylethyl acrylate |
| 24 | phenyltetramethyldisiloxanylethyl acrylate |
| 25 | isobutylhexamethyltrisiloxanylmethyl methacrylate |

EXAMPLES 26–28

These examples illustrate the preparation and properties of the copolymers containing N,N-dimethyl methacrylamide (MMMA).

The cylindrical rods were prepared in the manner described in Examples 1–8 from the mixtures of comonomers as shown in the following table:

| Example | MMMA (ml) | $S_1$ (ml) | MMA (ml) |
|---|---|---|---|
| 26 | 3.0 | 7.0 | |

-continued

| Example | MMMA (ml) | S₁ (ml) | MMA (ml) |
|---|---|---|---|
| 27 | 2.0 | 4.5 | 3.5 |
| 28 | 4.0 | 3.0 | 3.0 |

The rods thus prepared are transparent, hydrophilic. They become increased soft after hydration and are oxygen permeable. They can be fabricated into contact lenses or other prosthetic devices.

Obviously many other modifications and variations of the composition of this novel copolymer prepared therefrom, are possible in the light of the teachings given hereinabove. It is, therefore, to be understood that, within the scope of the appended claims, the invention can be practiced otherwise than as specifically described.

What is claimed is:

1. A composition of matter having the characteristics of increased hydrophilicity, softness after hydration and oxygen permeability, said composition being a copolymer of comonomers consisting essentially of:
   (a) about 15 to 65 parts by weight of at least one of the amide group containing monomers consisting of:
   (1) N-vinyl pyrrolidone having the structure

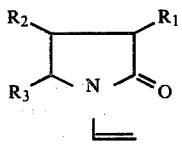

wherein $R_1$, $R_2$ and $R_3$, which may be the same or different.
are selected from a class consisting of hydrogen and $C_1$–$C_4$ alkyl groups; and (2) acrylamide and methacrylamide having the structure

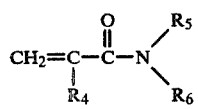

wherein $R_4$ is selected from a class consisting of a methyl group and hydrogen; $R_5$ and $R_6$, which may be the same or different, are selected from a class consisting of hydrogen and $C_1$–$C_4$ alkyl groups, wherein the selection both of $R_5$ and $R_6$ from hydrogen is excluded; and (b) about 10 to 85 parts by weight of at least one of a polysiloxanylalkyl ester having the structure:

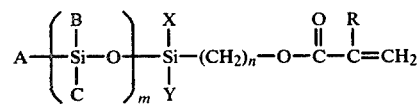

wherein X and Y, which may be the same or different, are selected from a class consisting of $C_1$–$C_4$ alkyl groups, phenyl groups and a Z group having the structure:

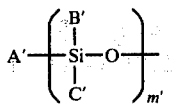

wherein A, B, C, A', B' and C', which may be the same or different, are selected from a class consisting of $C_1$–$C_4$ alkyl groups and phenyl groups; R is selected from a class consisting of a methyl group and hydrogen; m and m', which may be the same or different, are integers from one to four, and n is an integer from one to three.

2. The composition of claim 1 being especially adapted for use as a prosthetic device.

3. The composition of claim 2, wherein said X and Y are selected from a class consisting of a methyl group, phenyl groups and a Z group; said A, B, C, A', B' and C' are selected from a class consisting of a methyl group and phenyl groups.

4. The composition of claim 2, wherein said X and Y are selected from a class consisting of a methyl group and a Z group; said A, B, C, A', B' and C' are selected from a class consisting of a methyl group.

5. The composition of claim 4, wherein said hydrophilic vinyl pyrrolidone monomers are selected from a class consisting of a 1-vinyl pyrrolidone.

6. The composition of claim 5, wherein said X and Y are a Z group; m and m' are integers from one to two.

7. The composition of claim 6, wherein there is about 20 to 45 parts by weight of 1-vinyl pyrrolidone and about 20 to 55 parts by weight of at least one of a polysiloxanylalkyl ester.

8. A composition of matter having the characteristics of increased hydrophilicity, softness after hydration and oxygen permeability, said composition being a copolymer of comonomers consisting essentially of:
   (a) about 15 to 65 parts by weight of at least one of the amide group containing monomers consisting of:
   (1) N-vinyl pyrrolidone having the structure

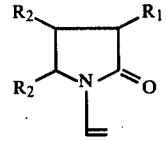

wherein $R_1$, $R_2$ and $R_3$, which may be the same or different, are selected from a class consisting of hydrogen and $C_1$–$C_4$ alkyl groups; and
(2) acrylamide and methacrylamide having the structure

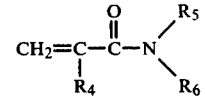

wherein $R_4$ is selected from a class consisting of a methyl group and hydrogen; $R_5$ and $R_6$, which may be the same or different, are selected from a class consisting of hydrogen and $C_1$–$C_4$ alkyl groups, wherein the selection both of $R_5$ and $R_6$ from hydrogen is excluded; and (b) about 10 to 85 parts by weight of at least one of a polysiloxanylalkyl ester having the structure:

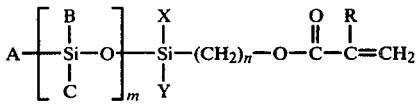

wherein X and Y, which may be the same or different, are selected from a class consisting of $C_1$–$C_4$ alkyl groups, phenyl groups and a Z group having the structure:

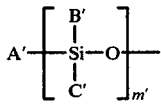

wherein A, B, C, A', B' and C', which may be the same or different, are selected from a class consisting of $C_1$–$C_4$ alkyl groups and phenyl groups; R is selected from a class consisting of a methyl group and hydrogen; m and m', which may be the same or different, are integers from one to four, and n is an integer from one to three; and (c) 0 to about 75 parts by weight of at least one of an ester of a $C_1$–$C_{20}$ monohydric alkanol and an acid selected from a class consisting of acrylic and methacrylic acids.

9. The composition of claim 8 being especially adapted for use as a prosthetic device.

10. The composition of claim 9, wherein said X and Y are selected from a class consisting of a methyl group, phenyl groups and a Z group; said A, B, C, A', B' and C' are selected from a class consisting of a methyl group and phenyl groups.

11. The composition of claim 9, wherein said X and Y are selected from a class consisting of a methyl group and a Z group; said A, B, C, A', B' and C' are selected from a class consisting of a methyl group.

12. The composition of claim 11, wherein said hydrophilic vinyl pyrrolidone monomers are selected from a class consisting of a 1-vinyl pyrrolidone.

13. The composition of claim 12, wherein said X and Y are a Z group; m and m' are integers from one to two.

14. A composition of matter specially adapted for use as a prosthetic device having the characteristics of increased hydrophilicity, softness after hydration and oxygen permeability, said composition being a copolymer of comonomers consisting essentially of:

(a) about 20 to 45 parts by weight of at least one of the amide group containing monomers consisting of N-vinyl pyrrolidone and N,N-dimethyl methacrylamide;

(b) about 20 to 55 parts by weight of at least one of a polysiloxanyl ester having the structure:

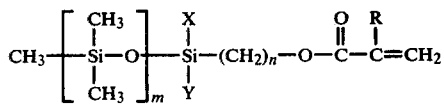

wherein X and Y, which may be the same or different, are selected from a class consisting of a methyl group and a Z group having the structure:

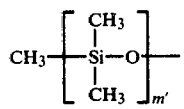

wherein R is selected from a class consisting of a methyl group and hydrogen; m and m', which may be the same or different, are integers from one to two, and n is an integer from one to three; and (c) 0 to about 30 parts by weight of at least one of an ester of a $C_1$–$C_{20}$ monohydric alkanol and an acid selected from a class consisting of acrylic and methacrylic acids.

* * * * *